(12) United States Patent
Gabryjelski

(10) Patent No.: US 6,850,994 B2
(45) Date of Patent: Feb. 1, 2005

(54) METHOD FOR DETERMINING STATUS OF A COMPUTER DEVICE AND DETECTING DEVICE BEHAVIOR IN RESPONSE TO A STATUS REQUEST

(75) Inventor: Henry P. Gabryjelski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 09/992,464

(22) Filed: Nov. 16, 2001

(65) Prior Publication Data

US 2003/0097496 A1 May 22, 2003

(51) Int. Cl.[7] ............................. G06F 3/00; G06F 13/00
(52) U.S. Cl. ............................. 710/19; 710/15; 710/18; 710/17; 710/48
(58) Field of Search ............................. 710/17, 18, 19, 710/15, 48

(56) References Cited

U.S. PATENT DOCUMENTS 5,864,686 A * 1/1999 Kaiser et al. ................ 710/309
6,249,826 B1 * 6/2001 Parry et al. ..................... 710/19
6,314,476 B1 * 11/2001 Ohara ............................ 710/15

OTHER PUBLICATIONS 13.5 Get Event/Status Notification Command; Proposal for a Small Form Factor Committee Specification of: Mt. Fuji Commands for Multimedia Devices; SFF8090i v5; Revision 1.1; Nov. 8, 2000; pp. 1–26; 263–273.

* cited by examiner

Primary Examiner—Jeffrey Gaffin
Assistant Examiner—Tammara Peyton
(74) Attorney, Agent, or Firm—Leydig, Voit & Mayer, Ltd.

(57) ABSTRACT

A method and system allows a device driver to obtain the status of a device that may exhibit one of two distinct behaviors in responding to status requests that designate a plurality of event types associated with a device. Devices exhibiting the first behavior respond to the status requests by providing the status for the highest priority event type designated in the status request. Device exhibiting the second behavior respond to the status requests by providing the status for the highest priority event type that has undergone a status change. In one implementation, the device driver transmits a series of distinct status requests such that the status of all event types can be determined. In a related aspect of the invention, the device driver also analyzes the response message to determine if the device exhibits the second behavior type. When the second behavior type is detected, only a single type of status request is sent to obtain the status of all event types.

24 Claims, 9 Drawing Sheets

| | Status Request (354) | Response Message (356) | Device Behavior (358) |
|---|---|---|---|
| 350 | 01010000 | 100 : 0 | Unknown |
| | 01000000 | 110 : 0 | Unknown |
| | 00000000 | | |
| 352 | 01010000 | 100 : N | Unknown |
| | 01010000 | 110 : N | Known Type 2 |

FIG. 8

METHOD FOR DETERMINING STATUS OF A COMPUTER DEVICE AND DETECTING DEVICE BEHAVIOR IN RESPONSE TO A STATUS REQUEST

TECHNICAL FIELD

This invention relates generally to computer operating systems and, more particularly, relates to methods and systems that allow a device driver to obtain the status of a plurality of event types associated with a device.

BACKGROUND OF THE INVENTION

A computer is typically connected to one or more peripherals such as those used to access removable and non-removable media. Examples of such peripherals include hard disk drives, CD-ROM drives, digital versatile disk (DVD) drives and the like. The computer has an operating system that provides an interface between application programs and these peripherals. For example, the operating system will receive requests from an application program to access a peripheral, e.g. read data from or write data to the media. The operating system then translates the request into a form that will be understood by the peripheral. A portion of the operating system, usually called a device driver, performs this function.

In general, the operating system has access to data that allows the operating system to determine the current status of a peripheral thereby facilitating efficient communication. For example, before the operating system attempts to read from media in a DVD drive, the operating system first determines whether the DVD drive is busy completing another task. If the device is busy, the operating system may defer a request to read from the media until the drive is available and can execute the required task. To provide the operating system with current data on the status of a peripheral, the device driver periodically queries the peripheral to obtain its updated status information. The device, in turn, provides a response message with status information which the device driver forwards to the operating system as necessary.

One method by which a device driver can query a peripheral to obtain its status is by transmitting a GET EVENT/STATUS NOTIFICATION (GESN) command. The GESN command is described in the Mt. Fuji Commands for Multimedia Devices, SFF-8090i v5 standard (referred to herein as the Multimedia Devices standard). Specifically, the GESN command allows the device driver to request the status for one or more event types associated with a peripheral. Event types are used to classify the different types of events that may occur at the peripheral. For example, a media event type is used to describe events related to the insertion and removal of media e.g. a CD ROM or DVD disk.

The Multimedia Devices specification defines a plurality of event types for which the status may be requested. For example, in addition to the media event type, a device busy event type provides status information on the peripheral's ability to accept new commands. Other event types such as power management, external request and multi-host are also defined.

When a peripheral receives a GESN command, it provides a corresponding response message to the device driver. The format of the response message, which is also defined by the Multimedia Devices standard, only allows the status for one event type to be reported in a single response message and further only allows one response message per GESN command.

The status included in a response message indicates whether or not the status for the event type being reported has changed. A status of "no change" or "NoChg" for an event type means that the status has not changed since it was last reported to the device driver. Where some type of status change has occurred, the nature of that status change is included in the response message. For example, if a DVD disk is inserted into a DVD drive and becomes ready for access, the drive will report a status of "NewMedia" the next time it provides a response message for the media event type.

The device driver can request the status for multiple event types with a single GESN command. However, as discussed above, the peripheral only provides one response message per GESN command and each response message only includes the status for one event type. Each event type has a priority and the peripheral uses the assigned event type priorities to select which event type will be reported in the response message.

Unfortunately, all peripherals do not use the event priorities in a uniform manner. Some peripherals treat "NoChg" in the status of an event type as always being a reportable event. These peripherals always report the status for the highest priority event type designated in the corresponding GESN command even if the status of that event type is "NoChg." Other peripherals treat "NoChg" as a non-reportable event as long as some type of a status change has occurred for at least one of the designated event types. These peripherals report the status for the highest priority event type that has undergone a status change.

To effectively communicate, the device driver needs to account for devices that respond to commands differently. For example, in the case of the GESN command, the device driver should issue a command such that the status of all event types is obtained regardless of how the device uses the event type priorities. Some device drivers maintain a drive list that includes the identification of the various peripheral models supported as well as data that describes how the peripheral responds to commands, such as the GESN command. The device driver identifies the peripheral model and, based on information in the drive list, tailors the way in which it communicates with the peripheral.

Drive lists suffer from numerous disadvantages. One disadvantage of drive lists is that they are both time consuming and costly to implement. There are typically thousands of models for a given type of peripheral. Each peripheral must be tested to determine how it responds to commands and the drive list must be created. Another disadvantage of using drive lists is that they become outdated as soon as another peripheral model appears on the market. Thus, the drive list must be updated and distributed if the device driver is to maintain compatibility with all available models.

From the foregoing it is apparent that an improved method of maintaining compatibility with different peripherals is needed. In particular, a method is needed that allows a device driver to obtain the status of devices that respond to status requests in different ways without the need to maintain a drive list.

SUMMARY OF THE INVENTION

In accordance with the invention, a system and method are provided that allow a device driver to obtain the status of a plurality of event types associated with a device. The device driver transmits a status request designating one or more event types. When the device receives the status request, it provides a response message that includes the status for one of the designated event types. The event types are prioritized in accordance with a standard and these priorities are used by the device to select which event type will be included in the response message. Some devices exhibit a first behavior and treat the status of all event types as reportable even if there has been no change in the status of a particular event type since it was last reported to the device driver. These devices always provide a response message with the status for the highest priority event type that was designated in the status request. Other devices exhibit a second behavior and treat no change in the status of an event type as non-reportable if at least one event type has incurred some type of status change. These devices provide a response message with the status for the highest priority event type that has undergone a status change.

In an embodiment of the invention, the device driver transmits a series of distinct status requests to the device during periodic test cycles. These distinct requests are sent such that all status changes for the event types are obtained regardless of whether the device exhibits the first behavior or the second behavior. In a related aspect of the invention, the device driver analyzes the response messages to determine if the device exhibits the second behavior. Where the second behavior is exhibited, the device driver only sends a single type of status request during each test cycle.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is an exemplary sequence of status requests and response messages exchanged between a device and a device driver incorporating an embodiment of the invention.

DETAILED DESCRIPTION OF THE INVENTION

Figure 1:
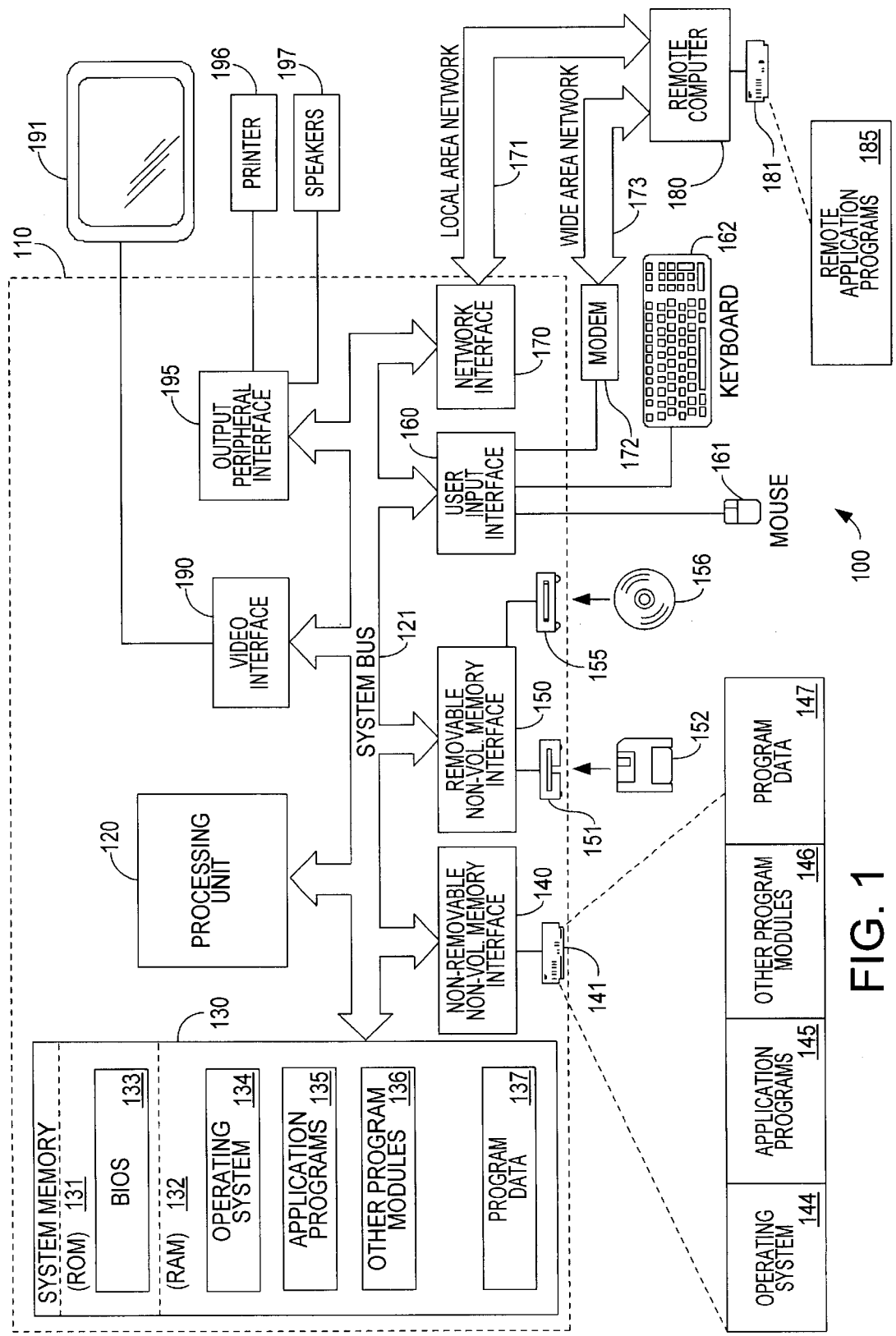
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
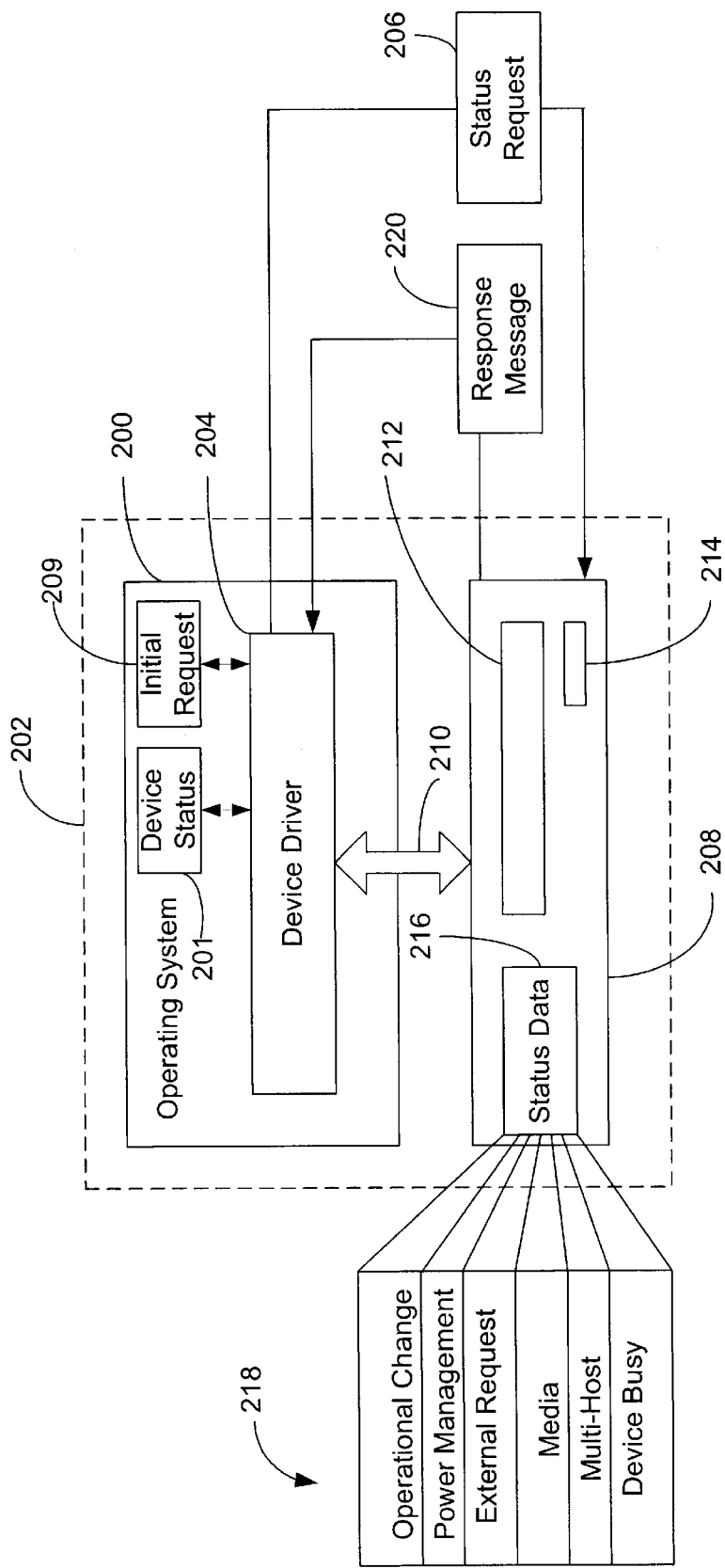
FIG. 2 is an example of a computer, having a peripheral and corresponding device driver, on which the present invention can be implemented.

An example of an operating environment in which the present invention may be utilized is shown in FIG. 2. As generally shown, an operating system 200 executes within a computer 202. The computer 202 also includes one or more peripherals, such as device 208. A portion of the operating system 200, referred to herein as a device driver 204, facilitates communication between the operating system 200 and the device 208. Information is exchanged between the device driver 204 and the device 208 via a bus 210. As those skilled in the art will readily appreciate, the bus can take on a variety of forms. An example of a current bus standard is the Small Computer Systems Interface (SCSI). The operating system includes a device status register 201 which is used to store status information associated with the device 208.

The device 208 may be any type of peripheral. In the example shown, the device 208 is an optical disk drive such as a CD ROM or DVD drive. An eject button 214 allows a user to open a tray 212 on the device 208 so that removable media such as a CD ROM or DVD disk can be inserted into or removed from the device 208.

The device 208 stores information on its status in a device status register 216 that can take any of a variety of suitable forms. The device driver 204 obtains updated status information from the device 208 by transmitting a status request 206 via the bus 210 to the device 208. The device 208 then transmits a response message 220, also via bus 210, with updated status information based on its device status register 216. Preferably, the device driver 204 receives updated status information at regular periodic intervals, referred to herein as a test cycle. The test cycle typically occurs at a regular time interval, for example, once per second. The test cycle is serialized such that only one instance of the cycle occurs for the device 208 at a given point in time. This gives the operating system 200 access to current information on the status of the device 208.

The status data within the status register 216 maintained by the device 208 is organized as a set of event types 218. Each event type of the set of event types 218 describes a status for a certain aspect of the device 208. Examples of event types include: operational change request/notification, power management, external request, media, multi-host, and device busy. These event types are known in the art and are described in the Mt. Fuji Commands for Multimedia Devices standard SFF-8090i v5, Revisions 1.1, dated Nov. 8, 2000, p. 263–273, which document is hereby expressly incorporated by reference.

Each event type of the set of event types 218 can be (1) a supported event type, (2) a desired event type and/or (3) a usable event types. A supported event type is an event type for which the device 208 maintains status data in the status register 216. A desired event type is an event type for which operating system 200 intends to maintain device status data in register 201. Usable event types satisfy the criteria of the supported and desired event types. By way of example, the device 208 maintains status data within the status register 216 for all event types except for the operational change request/notification event type. The operating system 200 intends to maintain device status data in the register 201 for all event types except for the multi-host event type. In the present example, the usable event types include power management, external request, media and the device busy event type. The usable event types are stored as part of the initial request register 209. Preferably, the device driver 204 only requests the status for and only maintains data within the device status register 201 for usable event types.

To obtain status information, the device driver 204 transmits the status request 206 which designates one or more usable event types. The usable event types designated in the status request 206 are determined based on information in the initial request register 209. The function of the initial request register 209 is described in more detail below. For each status request 206, the device 208 transmits a corresponding response message 220. Regardless of the number of event types designated in the status request 206, the corresponding response message 220 provides the status for one event type. Accordingly, the device driver 204 obtains the status for one event type per status request 206.

The various event types 218 have a priority according to the Multimedia Devices standard with the event types shown at the top of the list depicted in FIG. 2 having a higher priority than those at the bottom of the list. For example, the operational change event type has the highest priority, the power management event type has the second highest priority etc. with the device busy event type having the lowest priority. If the device driver 204 transmits a status request designating more than one event type, the device 208 uses the event type priorities to select which event type is reported in the corresponding response message 220.

The response message 220 includes at least (1) an identification of the event type being reported and (2) its status. The status is either that there is no change in the status of the reported event type (NoChg) or, conversely that some type of status change has occurred. A status of "NoChg" specifically means that the status for that event type has not changed since last reported to the device driver 204.

The device 208 can exhibit one of at least two distinct behaviors when responding to a status request 206 that polls more than one of the supported event types. In a first behavior, the device 208's response message 220 provides the status of the highest priority event type designated in the corresponding status request 206 even if the status of that event type has a "NoChg" value. In a second behavior, the device 208 provides the status for the highest priority event type that has undergone some type of status change. Furthermore, if no event type has undergone a status change, the status of the highest priority event type designated in the status request 206 is always reported as "NoChg" regardless of whether the device exhibits the first behavior or the second behavior.

If a device exhibits the second behavior, the status for all usable event types can be obtained by repeatedly transmitting a status request designating all usable event types until device 208 provides a response message with a status of "NoChg" as this will only occur when there are no additional status changes to report. However, the method described above for the second behavior type cannot be used when a device exhibits the first behavior, as such a device reports the status for the highest priority event type designated in the corresponding status request 206. Thus, a device exhibiting the first behavior type reports a status of "NoChg" for the highest priority event type identified in the request and, therefore, blocks investigation of a status change for lower priority requested event types. In accordance with an embodiment of the present invention, to properly obtain the current status for all event types 218, the device driver 204 transmits status requests 206 in a manner such the status for all usable event types is determined during each test cycle regardless of whether device 208 exhibits the first behavior or the second behavior.

Figure 3:
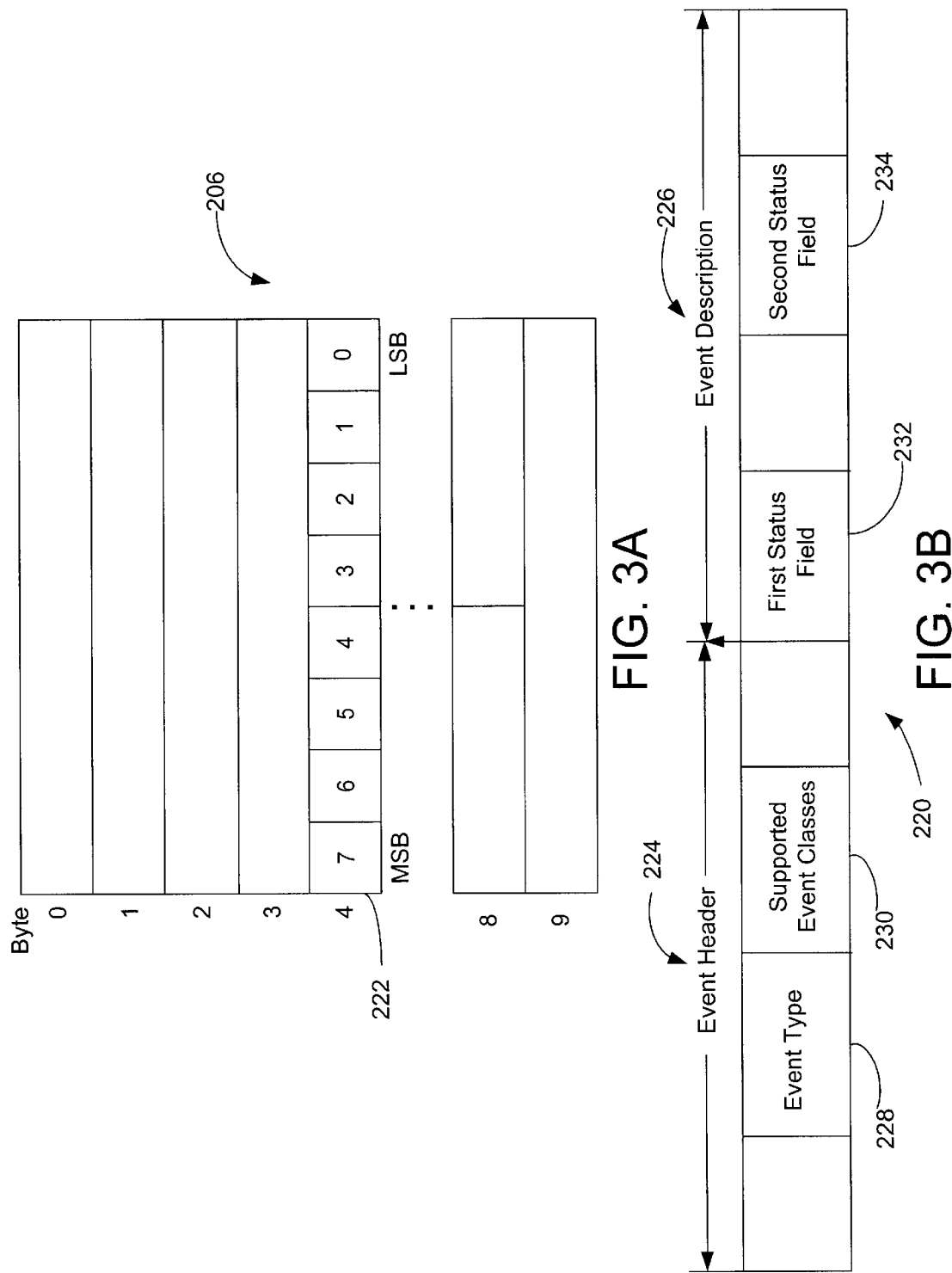
FIGS. 3A & 3B are examples of the data structures used for the status request and response messages used according to an embodiment of the invention.

An example of a data structure used to request the status of a plurality of event types from a device is shown in FIG. 3A. The status request 206, conforms to the GESN command structure described in the Multimedia Devices standard. As generally shown, the status request 206 includes a series of bytes generally labeled 0 though 9. One byte in the plurality of bytes, labeled 222 and referred to herein as a notification class request, comprises an eight-bit binary bitmask. The individual bits in the bitmask, labeled 0 though 7, each correspond to one of the set of event types 218 that may be associated with device 208 (FIG. 1) as shown in Table 1 below.

TABLE 1

| Bit | Event Type |
| --- | --- |
| 0 | Reserved |
| 1 | Operational Change Request/Notification |
| 2 | Power Management |
| 3 | External Request |
| 4 | Media |
| 5 | Multi Host |
| 6 | Device Busy |
| 7 | Reserved |

In the exemplary data structure shown, lower order bits have a higher priority than higher order bits. For example, the operational change request/notification has the highest priority and the device busy event type has the lowest priority.

To request the status for a particular event type, the corresponding bit in the notification class request is set to a distinct value. For example, a value of 1 may indicate that the status of the corresponding event type is being requested while a value of 0 indicates that its status is not being requested. As a specific example, to request the status of the media and device busy event types, the device driver 204 sends a status request 206 with the notification class field bitmask set to "101010000."

Data structure 206 can also be used to request the device's supported event types. This is typically done by setting all bits in the notification class request bitmask 222 to "0", i.e. such that no event types are specified. The device 208, in turn provides a response message 220 that identifies its supported event types.

An example of the format of a response message is shown in FIG. 3B. The response message 220 includes at least an event header 224 and an event descriptor 226. The event header 224 includes a three-bit field 228 that identifies the event type for which status information is being provided as shown in Table 2.

TABLE 2

| Bit Value | Event Type |
| --- | --- |
| 000 | No requested Event Classes are Supported |
| 001 | Operational Change Request/Notification |
| 010 | Power Management |
| 011 | External Request |
| 100 | Media |
| 101 | Multi-Host |
| 110 | Device Busy |
| 111 | Reserved |

Event header 224 may also include a supported event classes field 230. The supported event classes field is used when the device 208 is responding to a request for the supported event classes. This field includes an eight-bit bitmask that mirrors the notification class request bitmask 222 included in the status request 206 issued by the device driver 204 as shown in Table 1. For example, in response to a request for supported event types, the device may transmit a response message 220 that includes a supported events classes field 230 of "01011000." Bits 3, 4 and 6 being set to a value of 1 indicates that the device supports the external request, media and device busy event types. The event header 224 may include additional fields such as a field that designates the length of the data in the event header 224.

The event descriptor 226 includes at least a first status field 232 and a second status field 234. Collectively, the first status field 232 and the second status field 234 provide information on the status of the event type 228 identified in the response message event header 224. A value of zero in the first status field is equivalent to "NoChg" and means that no change in the status of the event type 228 specified in the event header 224 has occurred since it was last reported to the device driver 204.

Any non-zero value in the first status field 232 indicates that some type of status change has occurred. By way of example, if a user depresses the eject button 214 on the device 208 (FIG. 1), the next response message sent from the device 208 to the device driver 204 for the media event type will have an event type field 228 value of "100" and a first status field 232 value of "1 h" which corresponds to an eject request. The second status field 234 is used to supply additional status information. For example, for the media event type, the second status field indicates if the tray 212 on the device 208 (FIG. 1) is open or closed. The status changes that may be reported for each event type are defined in the Multimedia Commands standard and need not be described further herein.

Figure 4:
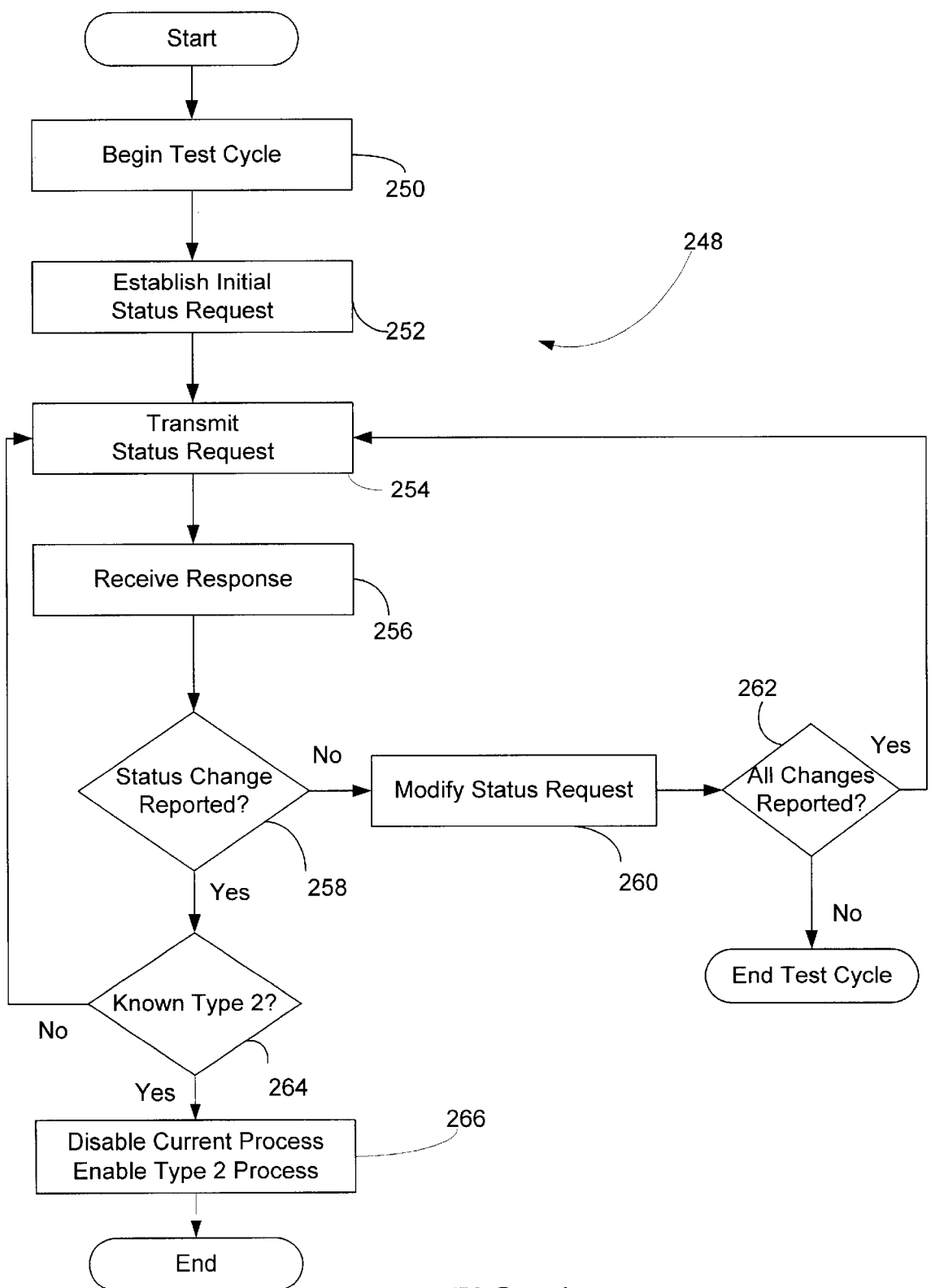
FIG. 4 is a flowchart outlining steps of an example procedure that may be followed in an embodiment of the invention.

An example of a process, labeled 248, executed by the device driver 204 to obtain the status for all usable event types during a test cycle when the device behavior type is unknown is shown in FIG. 4. As generally shown at step 250, each test cycle automatically begins at a regular time interval invoked, for example, by a timer-based interrupt that expires once per second. As previously described, the test cycle is serialized such that only one instance of the cycle occurs for the device 208 at a given point in time. In step 252, the device driver determines an initial status request by reference to the initial request register 209. The initial status request designates one or more of the usable event types.

The device driver then transmits the status request 206 to the device 208 during step 254. In step 256, the device driver 204 receives the response message 220 from the device 208. The response message 206 includes the status for one of the designated event types along with an identification of the event type for which the status is being reported.

In step 258, the device driver 208 determines whether the status reported in the response message 220 indicates "NoChg" for the reported event type or indicates some type of status for the reported event type. If the reported status is "NoChg" the status request is modified as shown in step 260. In particular, the status request is updated to designate a distinct set of one or more usable event types that does not include an event type for which "NoChg" has been previously reported during the current test cycle. If no event types meeting this criterion exist, no event types are designated in the status request 206.

In step 262, the device driver determines, based on the modified status request, if all status change data has been received for the usable event types, i.e. if no event types are designated in the status request 206. If all status data has been received, the current test cycle ends as generally shown. It will be understood that a new test cycle automatically begins at step 250 when the timer interrupt expires as previously described. If all status change data has not been received for the usable event types, the modified status request is transmitted from the device driver 204 to the device 208 as shown in step 254.

Returning to step 258, if a status change is reported in the response message 220, the process proceeds to step 264. In step 264, the device driver determines whether the device exhibits the second behavior type based on a comparison of the event types designated in the status request and the event type reported in the corresponding response message. By way of example, if the device 208 reports a status change for an event type other than the highest priority event type designated in the corresponding status request 206, the device is known to exhibit the second behavior type.

Figure 7:
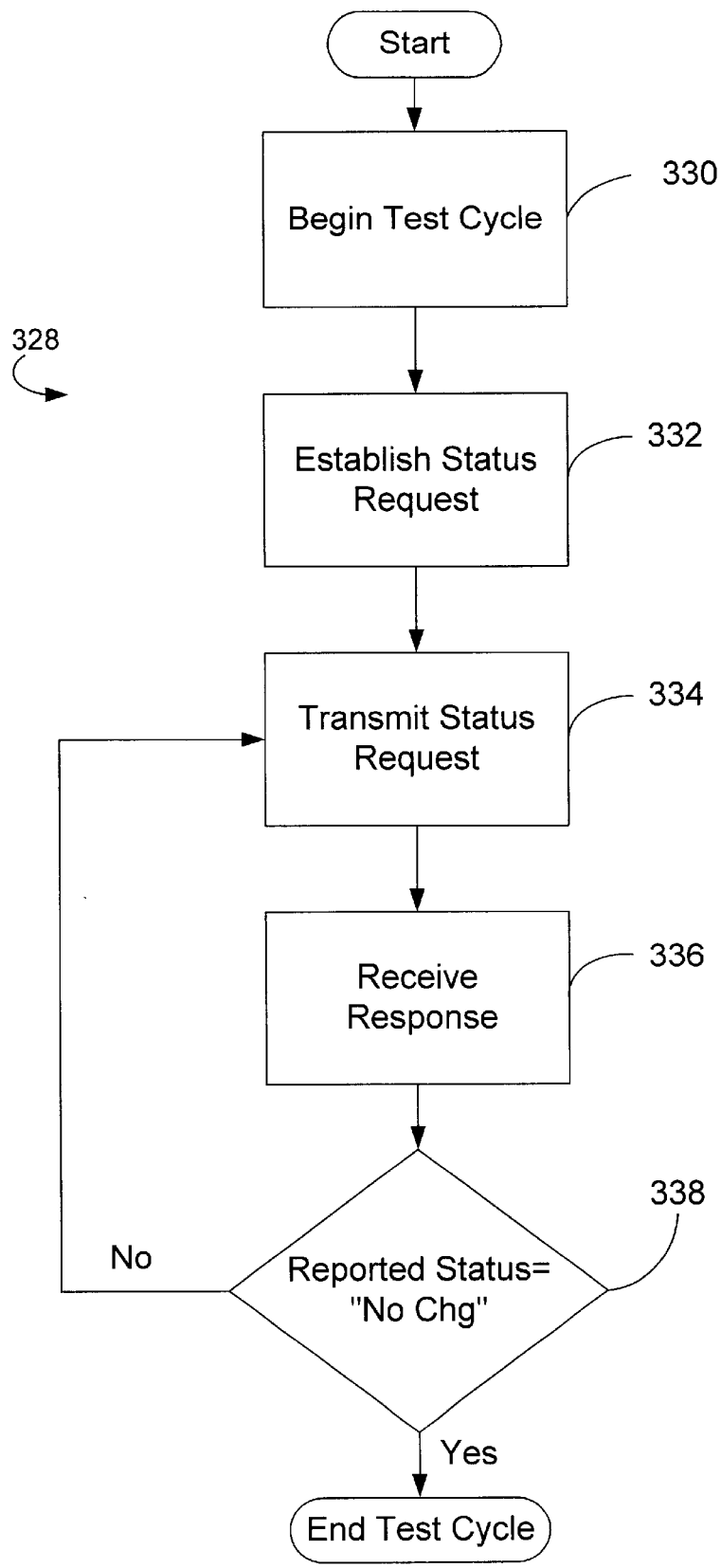
FIG. 7 is a flowchart outlining the steps of an example procedure that may be followed in an embodiment of the invention.

If the device is known to exhibit the second behavior type, the process 248 shown in FIG. 4 is disabled and the device driver enables a type two status request process as shown at step 266. An example of a type 2 status request process is described below with reference to FIG. 7. Alternatively, rather than disable process 248 immediately, process 248 can continue to execute until the end of the current test cycle. For example, rather than disable the current process 248 as shown in step 266, the process returns to step 254. The type two status request process, such as shown in FIG. 7, is then initiated during a subsequent test cycle.

If, in step 264, the device behavior type cannot be determined, the same status request 206 is retransmitted as shown in step 254. The status request is not modified as additional status change data may exist for the event type previously reported in the last response message 220. The process shown in FIG. 4 continues until all status changes for the usable events are obtained or until the device is determined to exhibit the second behavior type.

If, during the execution of process 248, the device 208 provides a response message 220 that indicates a status change has occurred for one of the designated event types, the device driver 204 forwards the status change information to the operating system 200. The device driver 204 accomplishes this by updating the device status register 201. For example, if the device 208 provides a response message with a status of "NewMedia" for the media event type, the device driver 204 updates an entry in the device status register 201 that corresponds to the media event type. The updated entry for the media event type in the status register 201 will identify the fact that new media has been inserted into device 208 and that the media is ready for access.

The above method allows the device driver to obtain status change information for each usable event type until a device is determined to exhibit the second behavior type.

Figure 5:
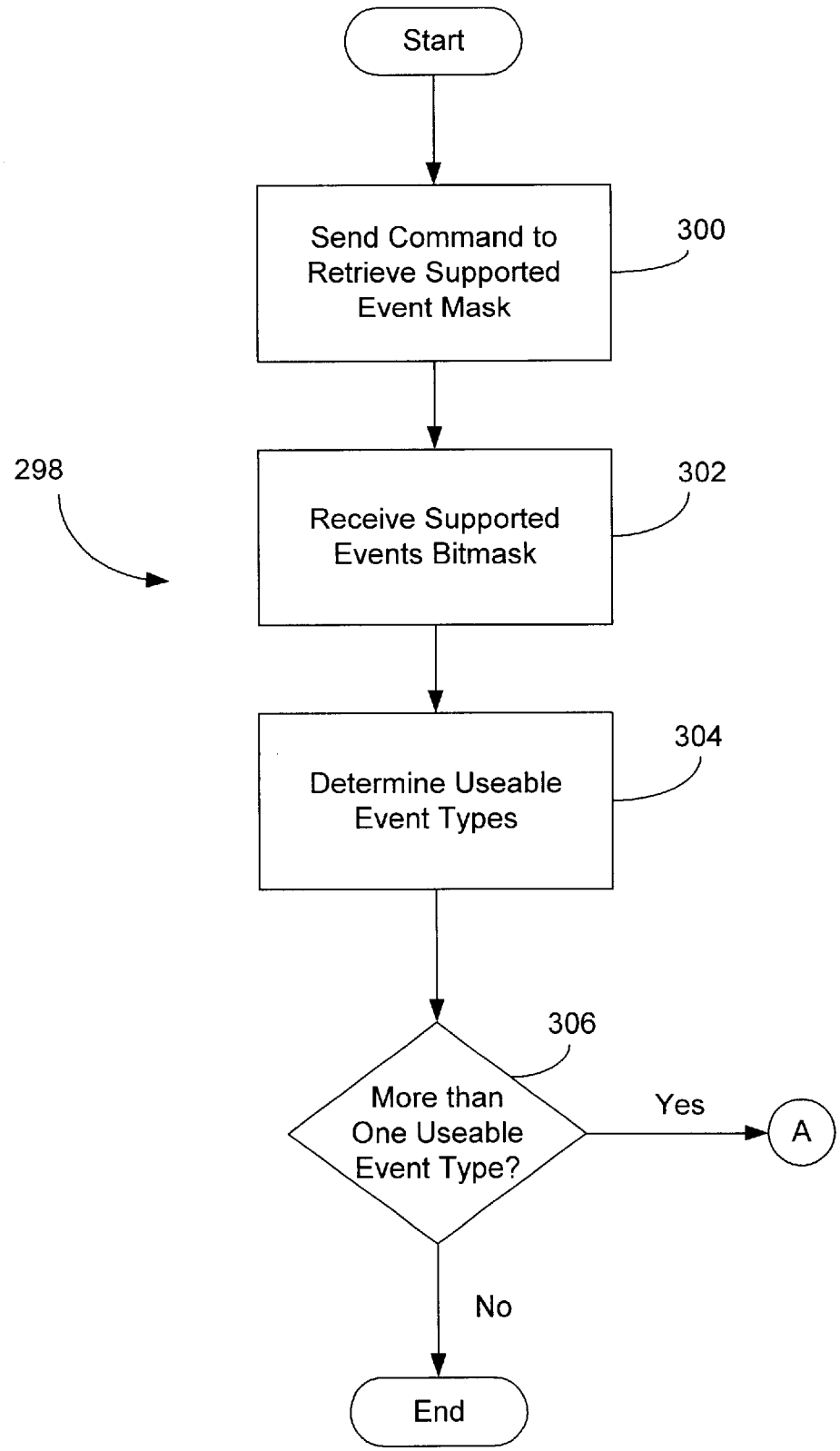
FIG. 5 is a flowchart outlining the steps of an example procedure that may be followed in an embodiment of the invention.
Figure 6:
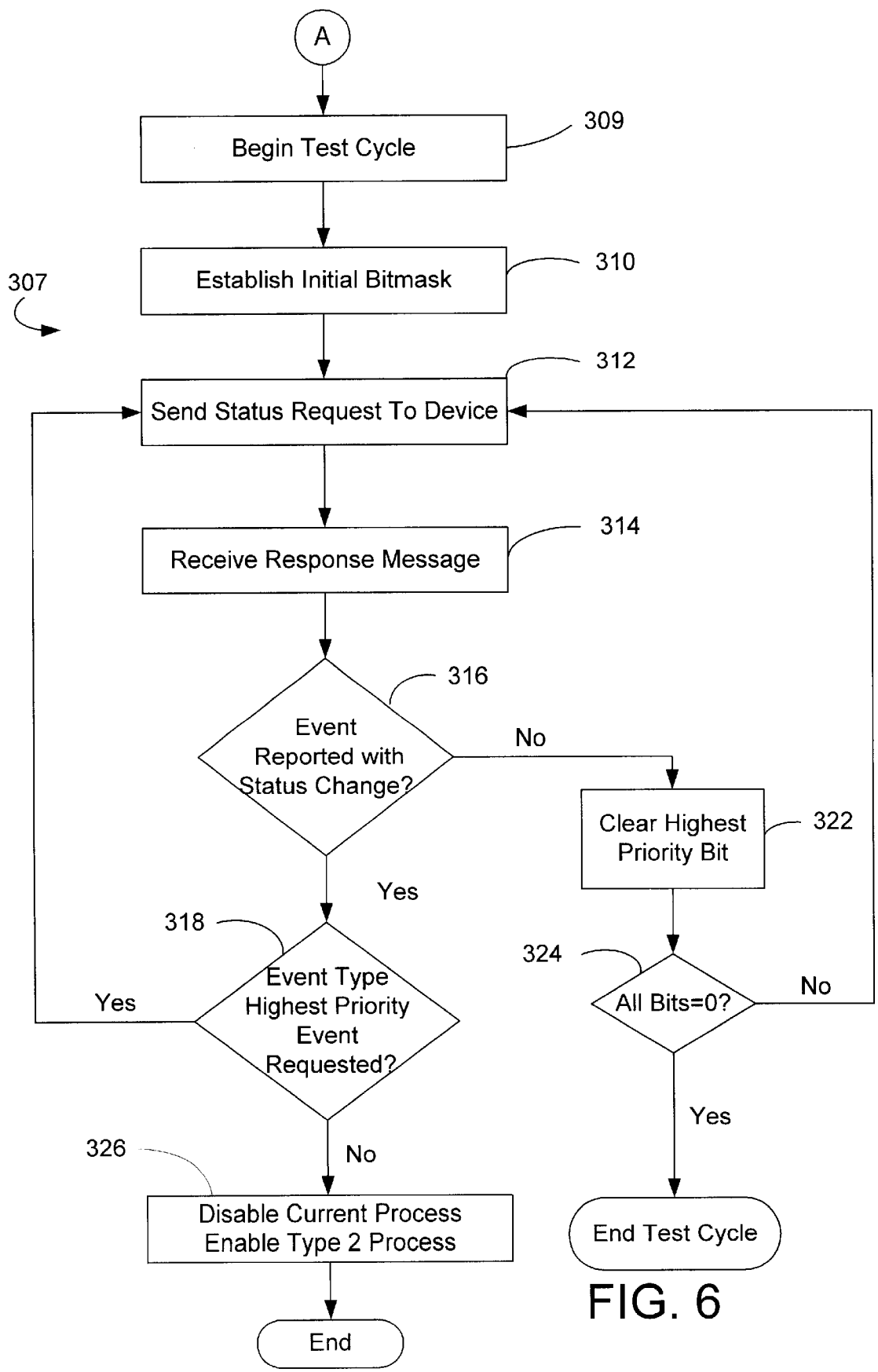
FIG. 6 is a flowchart outlining the steps of an example procedure that may be followed in an embodiment of the invention.

FIGS. 5–6 show a more detailed process that can be used by the device driver 204 to detect the device's behavior type and obtain the status for a plurality of event types associated with the device 208 (FIG. 1). A process, labeled 298, begins at step 300. At step 300, the device driver 204 sends a status request 206 to device 208 to obtain its supported event types as shown in FIG. 5. As previously described, this may be done by sending a status request with a notification class request bitmask 222 set to "00000000."

At step 302, the device driver 204 receives a response message 220 from the device 208. The response message includes the supported event type bitmask in the supported event classes field 230 (FIG. 4B). At step 304, the device driver 204 determines the usable event types from a desired event type bitmask, which is internally determined by the operating system, and the supported event type bitmask. The usable event types may, for example, be obtained by performing a logical AND operation between the supported and desired event bitmasks. As a specific example, if the desired event type bitmask is "01011000" and the supported event type bitmask is "01010010," the resulting usable event types are defined by a usable event type bitmask of "01010000." The usable event type bitmask is stored in the initial request register 209 for future use.

At step 306, the device driver 204 determines whether more than one usable event type exists, i.e. whether more than one bit in the usable event type bitmask is set to "1". If not, the process ends. Where only one usable event type is available, the status of that event type can be obtained by transmitting status requests 206 to the device 208 until the device responds with a status of "NoChg" for that event type. Such a process is described with reference to FIG. 7 below.

If there is more than one usable event type, device driver 204 proceeds to execute the process, labeled 307 as shown in FIG. 6. The process 307 shown in FIG. 6 allows the device driver to obtain the status for the plurality of usable event types that were identified during the process 298 shown in FIG. 5 regardless of whether the device 208 exhibits the first behavior type or the second behavior type. The process 307 shown in FIG. 6 also allows the device driver to identify devices that exhibit the second behavior type.

In step 309 the test cycle begins at periodic intervals, for example once per second. As previously described, this may occur as the result of an interrupt timer. Also previously described, the test cycle is serialized such that only one instance of the cycle occurs for the device 208 at any given time. In step 310 the notification class request bitmask is set such that all usable event types are designated, i.e. each bit in the bitmask corresponding to a usable event is set to "1" according the initial request register 209. At step 312, the device driver sends a status request including the notification class request to the device 208. In step 314, the device driver receives a response message from the device for one of the plurality of event types designated in the initial bitmask.

During step 316, the device driver analyzes the event type and the status for the event type included in the response message. If the status is a non-zero value, i.e. some type of status change, the device driver proceeds to step 318. At step 318, the device driver determines if the event type for which the status is being reported corresponds to the highest priority event type that was designated in the corresponding status request 206. If it is not, the behavior of the device 208 is known to be of second type and the process 307 is disabled and a type two process is enabled as shown at step 326. The type two process is described below with reference to FIG. 7.

Returning to step 318, if the event type for which the status change is reported is the highest priority event type specified in the status request 206, the program proceeds back to step 312 and the same status request is sent from the device driver to the device. The same status request is retransmitted because there may be additional status changes associated with the highest priority event type. Prior to exiting step 318, the device driver 204 updates the device status register 201 with the status change data.

Returning to step 316, if the status reported for an event type is "NoChg," i.e. a value of zero in the first status field of the response message 220 (FIG. 4B), the program proceeds to step 322. In step 322, the bitmask is modified such that the bit corresponding to the highest priority event type currently designated (set to "1") is cleared (set to "0").

The device driver proceeds to step 324 where the bitmask is evaluated to determine if all bits are set to 0. If all bits in the bitmask are set to "0", all status changes for the usable event types have been received and the process 307 ends until the next cycle begins as shown in step 309.

If in step 324 all bits are not set to "0", the modified bitmask is sent from the device driver 204 to the device 208 as shown in step 312. The process previously described is then carried out until all bits in the bitmask are set to zero, thereby ending process 307 until the next test cycle automatically begins at step 309, or until the device is determined to exhibit the second behavior type thereby disabling the process 307 as shown in step 326.

Turning to FIG. 7, an example of the process, labeled 328, used by device driver 204 in requesting the status from a device exhibiting the second behavior type or when there is only one event type is shown. The beginning of the test cycle is shown at step 330. As previously described the test cycle begins at periodic intervals, for example, once per second based on a timer interrupt and is serialized such that only one instance of the test cycle occurs for device 208 at a given time. At step 332, the device driver establishes a status request. The status request includes a notification class request designating all usable event types in accordance with the initial request register 209. In step 334, the device driver transmits the status request 206 to the device 208. At step 336, the device driver 204 receives a response message 220 from the device 208. As previously described, the device driver 204 may forward the status information to the operating system to update register 201 (FIG. 1).

In step 338, the device driver 204 determines if the response message includes a status of "NoChg." If it does, the process ends until the beginning of the next test cycle automatically begins at step 330. Otherwise, the device driver retransmits the status request as shown in step 334. Unlike the process described in connection with FIG. 6, the process shown in FIG. 7 does not modify the notification class request bitmask. The status request always designates all usable event types. Additional status requests are sent until a response message provides a status of "NoChg."

The process shown in FIG. 7 advantageously minimizes bus traffic because only a minimum number of status requests are sent from the device driver to the device. For example, if no event types have undergone a status change, only one status request is sent since the corresponding response message will indicate a status of "NoChg" for the highest priority event type. In contrast, the process shown in FIG. 6, requires at least as many status requests as there are usable event types. It should be emphasized that the process shown in connection with FIG. 7 is only used with a device exhibiting the second behavior type or when only one usable event type is available. If the device exhibits the first behavior and there are multiple usable event types, status requests continue to be transmitted via the process described in connection with FIG. 6 and process of FIG. 7 is not used.

A specific example of the process described in connection with FIG. 6 will now be described with reference to FIG. 8. In the example, two test cycles are shown, labeled 350 and 352. Each test cycle shows a series of status requests 354, the corresponding response message 356 and whether the device behavior, labeled 358, is known or unknown.

The example status requests 354 and corresponding response messages 356 are shown in simplified form. For the status request, only the notification class request bitmask is shown. The response message is shown as "event type:status." The event type includes a numerical value that identifies the event type being reported as shown in Table 2. The status is identified as either zero "0" or non-zero "N." A status of "0" means "NoChg" in status while a status of "N" indicates some type of status change for that event type. As a specific example, "100:0" represents a response message including the status for the media event type with a status of "NoChg." It should be understood that the response messages in the example are illustrative as the actual response message received in response to a corresponding status request depends on the actual status of the device and on whether the device exhibits the first or second behavior type.

In the present example, it is assumed that the usable events were determined according to the process shown in FIG. 5 to be the media and device busy event types. Accordingly, the first status request transmitted during the first test cycle 350 includes a notification class request bitmask of "01010000." The example corresponding response message of "100:0" means that the device 208 has reported that the status of media event is "NoChg." Because the status reported is for the highest priority event type designated in the status request, the device driver cannot identify the behavior type of the device. In accordance with the process shown in FIG. 6, the device driver modifies the notification class request bitmask by clearing the lowest order bit to 0. The modified bitmask "01000000" is then transmitted to the device 208.

As generally shown, the device responds with a status of "110:0" which indicates that there is "NoChg" for the device busy event type. As this was the only event type requested by the device driver, the device driver cannot determine if the device exhibits the second behavior. The device driver again modifies the notification class request bitmask by clearing the lowest order bit, again according to the process of FIG. 6. Because all bits are now zero, the device driver has obtained the status for all usable event types and no further status requests are sent until a new test cycle begins.

The next test cycle 352 begins by again transmitting a notification class request bitmask with all usable event types set to "1" ("01010000"). The response message "100:N" indicates some type of status change for the media event type. Once again, because the status is reported for the highest priority event, the device driver cannot determine if the device exhibits the second behavior type. The device driver does not, however, clear the lowest order bit to zero because additional status changes may exist for the media event type. Accordingly, the device driver retransmits the same status request ("01010000") according the process of FIG. 6.

The next response message "110:N" indicates some type of status change for the device busy event type. Because the response message is for an event type other than the highest priority event type designated in the corresponding status request, the device driver determines that the device exhibits the second behavior type. In this example, the device detection process is disabled. Future status requests are sent in accordance with the process described in connection with FIG. 7.

Figure 9:
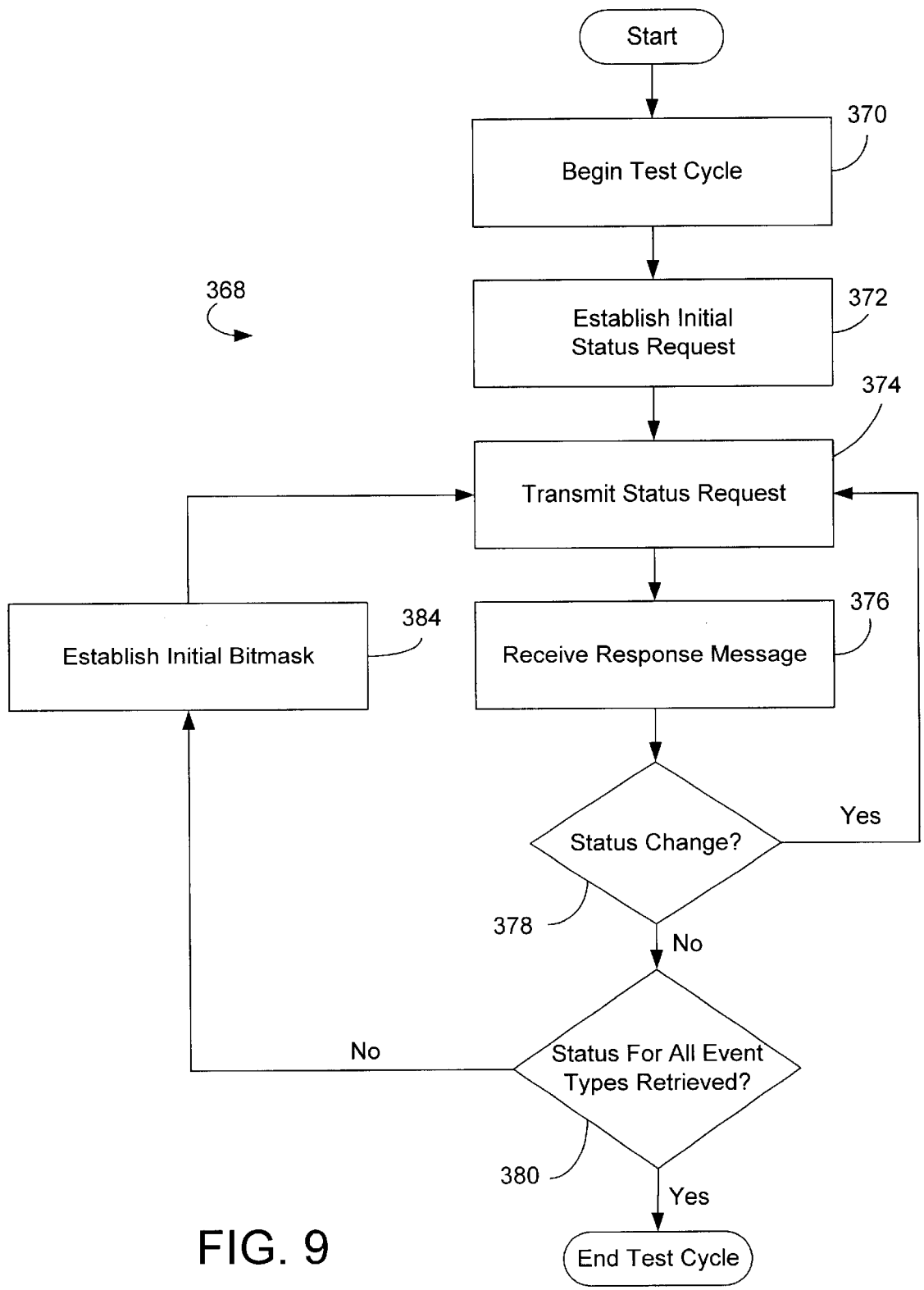
FIG. 9 is a flowchart outlining the steps of an example procedure that may be followed in an embodiment of the invention.

FIG. 9 shows an alternative process, labeled 368, to that described in connection with FIGS. 6–7 which allows the device driver to obtain the status changes for all usable event types by sending status requests that only request the status of one event type at a time. After determining the usable event types, for example as shown in steps 300–304 of FIG. 5, the process begins at the start of a test cycle as shown in step 370.

In step 372, the initial status request is set such that only one usable event is requested, i.e. only one bit in the notification class request is set to a value of "1". Although any usable event type may be designated, the process shown in FIG. 9 begins by designating the highest priority usable event type. At step 374, the device driver transmits a status request to the device.

In step 376, the response is received from the device. The response message includes the status for the usable event type designated in the corresponding status request.

As shown in step 378, the device driver analyzes the status to determine if there is a status change. If a status change is reported, the device driver updates status register 201 (FIG. 1) and returns to step 374 where the same status request is transmitted until the response message from the device indicates "NoChg" for that specified event type.

Once a status of "NoChg" is received for the specified event type, the device driver proceeds to step 380. In step 380, the device driver determines whether the status has been obtained for all usable event types during the current test cycle. If the status for all usable event types has been obtained, the process ends until a new test cycle automatically begins at step 370.

If in step 380, the device driver determines that the status for all event types have not been obtained, it proceeds to step 384 where it modifies the bitmask. The new bitmask sets the bit currently set to "1" to "0" and, although any remaining usable event type may be designated, sets the next highest priority usable event type bit to "1". The process then proceeds to step 374 where the modified status request is transmitted from the device driver 204 to the device 208. This process continues until the status for all event types is obtained.

Because this process only sends the request for one event type per status request, the device driver 204 is unable to analyze the response message to determine if the device exhibits the second behavior type. Accordingly, unlike the method described with reference to FIGS. 6–7, the device driver must always send multiple status requests to obtain the status for all usable event types. Thus, although FIG. 9 provides a single process that always allows the device driver to obtain all status changes for the usable event types, it may be less efficient than the process shown in FIGS. 6–7, particularly when used with a device that exhibits the second behavior type.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for executing a device status detection cycle in a device having an unknown status response behavior including at least a first and a second response behavior, comprising:

transmitting a status request from a device driver to the device, the status request including a request for the status of a plurality of event types;

receiving a status response from the device, the status response including a designation of one of the plurality of event types and the status for the one of the plurality of event types;

determining that the device exhibits the second behavior based upon a comparison between the status request and the designation of the one of the plurality of event types in the status response;

wherein the status request comprises a bitmask, the bitmask including a plurality of bits, each bit corresponding to an event type.

2. The method of claim 1 wherein the bits in the bitmask are set to a value of 1 to request the status for the corresponding event type.

3. A method for executing a device status detection cycle in a device having an unknown status response behavior including at least a first and a second response behavior, comprising:

transmitting a status request from a device driver to the device, the status request including a request for the status of a plurality of event types;

receiving a status response from the device, the status response including a designation of one of the plurality of event types and the status for the one of the plurality of event types;

determining that the device exhibits the second behavior based upon a comparison between the status request and the designation of the one of the plurality of event types in the status response;

wherein the request for the status of the plurality of event types includes a first and a second event type and the step of determining that the device exhibits the second behavior occurs when the response from the device includes the designation of the second event type.

4. The method of claim 3 wherein the first event type has a higher priority than the second event type.

5. A method for executing a device status detection cycle in a device having an unknown status response behavior including at least a first and a second response behavior, comprising:

transmitting a status request from a device driver to the device, the status request including a request for the status of a plurality of event types;

receiving a status response from the device, the status response including a designation of one of the plurality of event types and the status for the one of the plurality of event types;

determining that the device exhibits the second behavior based upon a comparison between the status request and the designation of the one of the plurality of event types in the status response;

wherein the status request comprises a GESN command.

6. The method of claim 3 wherein the step of determining that the device exhibits the second behavior occurs when the device responds to the status request by providing the status for the event type having a highest priority and that has changed status.

7. A method of determining a status for a plurality of event types of a device during a test cycle and provided by the device in accordance with a standard, comprising:

establishing a first status request comprising a request for the status of at least one event type of the device;

sending the first status request to the device within the test cycle;

receiving a response from the device, the response comprising the status for the at least one event type;

comparing the first status request to the response and, as a result of the comparison, establishing a second status request such that the second request is distinct from the first status request; and sending the second status request to the device within the test cycle.

8. The method of claim 7, further comprising:

determining that the status for each of the plurality of event types has been received and, as a result, exiting the test cycle.

9. A method of determining a status for a plurality of event types of a device during a test cycle and provided by the device in accordance with a standard, comprising:

establishing a first status request comprising a request for the status of at least one event type of the device;

sending the first status request to the device within the test cycle;

receiving a response from the device, the response comprising the status for the at least one event type;

comparing the first status request to the response and, as a result of the comparison, establishing a second status request such that the second request is distinct from the first status request;

sending the second status request to the device within the test cycle;

wherein the test cycle comprises one of a plurality of test cycles, each of the plurality of test cycles executing at successive periodic intervals.

10. A method of determining a status for a plurality of event types of a device during a test cycle and provided by the device in accordance with a standard, comprising:

establishing a first status request comprising a request for the status of at least one event type of the device;

sending the first status request to the device within the test cycle;

receiving a response from the device, the response comprising the status for the at least one event type;

comparing the first status request to the response and, as a result of the comparison, establishing a second status request such that the second request is distinct from the first status request;

sending the second status request to the device within the test cycle;

wherein the request for the status of the at least one event type comprises a bitmask, the bitmask having a plurality of bits, each bit corresponding to one of the plurality event types.

11. The method of claim 10 wherein each bit in the bitmask is set to either a first value or second value, the first value indicating a request for the status of the corresponding event type.

12. The method of claim 10 wherein each bit has a priority, a lowest order bit having the highest priority and a highest order bit having the lowest priority.

13. A method of obtaining the status for a plurality of event types associated with a device, each of the plurality of event types having a priority, the status of each of the plurality of event types being indicative of either a change in status or no change in status, comprising:

determining that the device responds to status requests designating a plurality of event types by providing the status for the highest priority event type exhibiting a change in status, wherein the plurality of event types each comprise a usable event typ; and repeatedly transmitting status requests designating each of the plurality of event types until all status change data for the plurality of event types is obtained by the device driver.

14. The method of claim 13 wherein the step of determining that the device responds to status requests by providing the status for the highest priority event type exhibiting a change in status comprises comparing the status requests designating the plurality of event types with a response message.

15. The method of claim 14 wherein the response message comprises the status for one of the plurality of event types.

16. A computer-readable medium having computer executable instructions for a method for executing a device status detection cycle in a device having an unknown status response behavior including at least a first and a second response behavior, the method comprising:

transmitting a status request from a device driver to the device, the status request including a request for the status of a plurality of event types;

receiving a status response from the device, the status response including a designation of one of the plurality of event types and the status for the one of the plurality of event types;

determining that the device exhibits the second behavior based upon a comparison between the status request and the designation of the one of the plurality of event types in the status response.

17. A computer-readable medium having computer executable instructions for a method for executing a device status detection cycle in a device having an unknown status response behavior including at least a first and a second response behavior, the method comprising:

transmitting a status request from a device driver to the device, the status request including a request for the status of a plurality of event types; wherein the status request comprises a bitmask, the bitmask including a plurality of bits, each bit corresponding to an event type;

receiving a status response from the device, the status response including a designation of one of the plurality of event types and the status for the one of the plurality of event types;

determining that the device exhibits the second behavior based upon a comparison between the status request and the designation of the one of the plurality of event types in the status response.

18. The computer-readable medium of claim 17 wherein the bits in the bitmask are set to a value of 1 to request the status for the corresponding event type.

19. The computer-readable medium of claim 18 wherein the request for the status of the plurality of event types includes a first and a second event type and the step of determining that the device exhibits the second behavior occurs when the response from the device includes the designation of the second event type.

20. The computer-readable medium of claim 19 wherein the first event type has a higher priority than the second event type.

21. A computer-readable medium having computer executable instructions for a method for executing a device status detection cycle in a device having an unknown status response behavior including at least a first and a second response behavior, the method comprising:

transmitting a status request from a device driver to the device, the status request including a request for the status of a plurality of event types, wherein the status request comprises a GESN command;

receiving a status response from the device, the status response including a designation of one of the plurality of event types and the status for the one of the plurality of event types;

determining that the device exhibits the second behavior based upon a comparison between the status request and the designation of the one of the plurality of event types in the status response.

22. The computer-readable medium of claim 16 wherein the step of determining that the device exhibits the second behavior occurs when the device responds to the status request by providing the status for the event type having a highest priority and that has changed status.

23. A computer-readable medium having computer executable instructions for a method of determining a status for a plurality of event types of a device during a test cycle and provided by the device in accordance with a standard, the method comprising:

establishing a first status request comprising a request for the status of at least one event type of the device;

sending the first status request to the device within the test cycle;

receiving a response from the device, the response comprising the status for the at least one event type;

comparing the first status request to the response and, as a result of the comparison, establishing a second status request such that the second request is distinct from the first status request;

sending the second status request to the device within the test cycle; and determining that the status for each of the plurality of event types has been received and, as a result, exiting the test cycle.

24. A computer-readable medium having computer executable instructions for a method of obtaining the status for a plurality of event types associated with a device, each of the plurality of event types having a priority, the status of each of the plurality of event types being indicative of either a change in status or no change in status, the method comprising:

determining that the device responds to status requests designating a plurality of event types by providing the status for the highest priority event type exhibiting a change in status;

repeatedly transmitting status requests designating each of the plurality of event types until all status change data for the plurality of event types is obtained by the device driver;

wherein the step of determining that the device responds to status requests by providing the status for the highest priority event type exhibiting a change in status comprises comparing the status requests designating the plurality of event types with a response message.

* * * * *